United States Patent

Mardon et al.

[11] Patent Number: 5,887,045
[45] Date of Patent: Mar. 23, 1999

[54] ZIRCONIUM ALLOY TUBE FOR A NUCLEAR REACTOR FUEL ASSEMBLY, AND METHOD FOR MAKING SAME

[75] Inventors: Jean-Paul Mardon, Caluire; Jean Senevat, Saint Brevin les Pins; Daniel Charquet, Ugine Cedex, all of France

[73] Assignees: Framatome, Courbevoie; Compagnie General des Matières Nucléaires, Velizy-Villacoublay, both of France

[21] Appl. No.: 875,481

[22] PCT Filed: Jan. 26, 1996

[86] PCT No.: PCT/FR96/00137

§ 371 Date: Jul. 29, 1997

§ 102(e) Date: Jul. 29, 1997

[87] PCT Pub. No.: WO96/24140

PCT Pub. Date: Aug. 8, 1996

[30] Foreign Application Priority Data

Jan. 30, 1995 [FR] France .................................. 95 01025

[51] Int. Cl.[6] ....................................................... G21C 3/07
[52] U.S. Cl. ........................... 376/457; 420/422; 148/672
[58] Field of Search ..................................... 376/416, 457, 376/900; 420/422; 148/421, 672

[56] References Cited

U.S. PATENT DOCUMENTS

| 3,150,972 | 9/1964 | Rösler | 376/457 |
| 4,735,768 | 4/1988 | Stehle et al. | 376/416 |
| 4,938,920 | 7/1990 | Garzarolli et al. | 376/457 |
| 5,278,882 | 1/1994 | Garde et al. | 376/416 |

FOREIGN PATENT DOCUMENTS

| 0085553 | 8/1983 | European Pat. Off. . |
| 0212351 | 3/1987 | European Pat. Off. . |
| 0622470 | 11/1994 | European Pat. Off. . |
| 3805124 | 8/1989 | Germany . |

*Primary Examiner*—Daniel D. Wasil
*Attorney, Agent, or Firm*—Law Offices Pollock, Vande Sande & Amernick

[57] ABSTRACT

A tube of zirconium-based alloy for constituting all or a portion of a cladding or guide tube for a nuclear fuel assembly. The tube is made of an alloy containing, by weight, 1.0–1.7% of tin, 0.55–0.80% of iron, 0.20–0.60% total of chromium and/or vanadium, and 0.10–0.18% of oxygen, with 50–200 ppm of carbon and 50–120 ppm of silicon. The alloy further contains only zirconium and unavoidable impurities, and it is completely recrystallized.

25 Claims, No Drawings

ZIRCONIUM ALLOY TUBE FOR A NUCLEAR REACTOR FUEL ASSEMBLY, AND METHOD FOR MAKING SAME

The present invention concerns zirconium-based alloy tubes for use in nuclear reactor fuel assemblies. Tubes of that type are usable in particular for constituting fuel rod cladding, for forming the external portion of such cladding, or for forming guide tubes which receive the rods of control clusters.

Cladding of that type is frequently constituted by tubes made from an alloy known as "Zircaloy 4" which contains, in addition to zirconium, 1.2% to 1.7% by weight of tin, 0.18% to 0.24% by weight of iron, 0.07% to 0.13% by weight of chromium and 0.10% to 0.16% by weight of oxygen. A number of alloys which are derived from those previous alloys have also been proposed, in particular alloys in which the chromium is either completely or partially replaced by vanadium and/or in which the oxygen content exceeds that given above, with a corresponding reduction in the contents of some of the other addition elements.

Particular qualities which are required in a tube for use as cladding are good resistance to corrosion by water at high pressure and at high temperature, limited long term creep, long term retention of mechanical properties, limited expansion on irradiation and reduced sensitivity to lithium; in addition, these properties must be reproducibly obtainable, and the alloy must have metallurgical properties at the various production stages (in particular rollability) which keeps the rejection rate down to an acceptable value.

The behavior of Zircaloys on irradiation constitutes a factor which is inhibiting advances in operating conditions for nuclear reactors as regards increasing cycle time. This is mainly due to uniform corrosion.

A particular aim of the invention is to provide a tube with improved characteristics which can be in the recrystallized state when good creep behavior is required above all, or which can be in a metallurgically stress-relieved state, which is more easily manufactured econom-cally to within strict dimensional tolerances (in particular as regards circularity errors), and which is better as regards generalized corrosion.

For that purpose, there is provided a zirconium-based alloy tube containing, by weight, 1% to 1.7% of tin, 0.55% to 0.8% of iron, 0.20% to 0.60% in total of at least one element selected from chromium and vanadium, and 0.10% to 0.18% of oxygen, the carbon and silicon contents being controlled and being respectively in the range 50 ppm to 200 ppm and in the range of 50 ppm to 120 ppm, the alloy further containing only zirconium and unavoidable impurities. The tube, in its final state, is either stress-relieved or recrystallized depending on the required properties.

Vanadium is essentially present in fine precipitates in the form $Zr(Fe,V)_2$; this is also the case for chromium, which is present in precipitates in the form $Zr(Fe,Cr)_2$.

A high Fe/(V+Cr) ratio, which may exceed 3/1, can further improve resistance to corrosion in a lithium-containing medium. As a general rule, this ratio will be close to 2/1. It is generally preferable to use either chromium alone, or vanadium alone rather than a combination of the two.

The precise composition selected from the above range will depend on the properties which are to be prioritized. Usually, an alloy containing 1.3% Sn, 0.60% Fe, 0.25% V or Cr, 0.14% $O_2$, 140 ppm C and 90 ppm Si will be a good compromise.

The presence of vanadium reduces the fraction of absorbed hydrogen and improves resistance to corrosion in an aqueous medium at high temperature and high pressure, even in the event of localized boiling.

If one requirement is to reduce creep as much as possible during the initial stage of reactor use, it may be advantageous to have a high tin, carbon, and/or oxygen content. A carbon content of more than 100 ppm is favorable as regards creep; but above 200 ppm, expansion on irradiation becomes large. The silicon content is "controlled" to take advantage of its regulatory effect on structures and its favorable influence on corrosion resistance.

A high value for the sum of the beta-producing elements (Fe+V+Cr) contributes to reducing the grain size of the metallurgical structure, which is a factor for good resistance to stress corrosion, ductility after irradiation, mechanical properties, and shaping. This sum is frequently at least 0.70%.

The invention also provides a process for the production of an alloy tube of the type defined above, comprising successively: casting an ingot and forging to a solid bar; water quenching the bar after heating, generally by induction, in the β phase; optional annealing in the range 640° C. to 760° C. (advantageously about 730° C.) to form the α phase; drawing a pierced billet to a tubular blank; optional annealing in α phase in the range 600° C. to 750° C. (advantageously about 650° C.); successive cold rolling steps to form tubes of decreasing thicknesses, with intermediate annealing steps in an inert atmosphere or in a vacuum at a temperature in the range 640° C. to 760° C., advantageously about 730° C. for the first two steps and 700° C. for subsequent steps; and a final annealing step in an inert atmosphere or in a vacuum at a temperature in the range 450° C. to 500° C. (advantageously about 485° C.) if a stress-relieved structure is required, or in the range 565° C. to 630° C. (advantageously about 580° C.) if a recrystallized structure is required. The set of heat treatments is advantageously such that the heat treatment parameter ΣA is in the range $10^{-18}$ to $10^{-16}$, ΣA g equal to the product of time t in hours multiplied by exp (−40000/T), T being expressed in Kelvins.

The first annealing step, after quenching, is advantageously carried out at 730° C.; the second, after extruding, is advantageously carried out at about 650° C.

The tube produced does not undergo any further heat treatment which would modify its metallurgical structure until the time it is used as a cladding tube or a guide tube. However, it does undergo more surface treatment and is then examined. The surface treatment may in particular comprise blast cleaning and film removal followed by rinsing. The surface treatment can be completed by polishing using a wheel. It is checked conventionally, either visually, and/or using ultrasound and/or using eddy currents.

Other characteristics will become more clear from the description of particular embodiments.

The following compositions found of interest:

| | COMPOSITIONS | | |
|---|---|---|---|
| | I | II | III |
| Tin | 1.3 | 1.3 | 1.3 |
| Iron | 0.6 | 0.6 | 0.6 |
| Vanadium | 0.3 | 0.25 | 0 |
| Chromium | 0 | 0 | 0.25 |
| Oxygen | 0.12 | 0.14 | 0.14 |
| Carbon | 140 | 140 | 140 |
| Silicon | 90 | 90 | 90 | the other components being zirconium and impurities.

The starting alloy was in the form of an ingot. It was formed into a bar by forging or rolling and, after heating to the β phase, was water quenched at a controlled rate to bring it into the α region, for example at a cooling rate in the range 5° C. per second to 30° C. per second until the temperature was less than about 800° C. After quenching, annealing was effected at a temperature of less than 800° C. to prevent transformation of the α phase into the β phase. Extrusion was carried out after machining a tubular billet and heating to between 600° C. and 700° C. The drawn blank, after undergoing any required annealing at a temperature of less than 800° C., then underwent the required number of successive cold rolling steps to bring it to the required thickness, with intermediate annealing steps carried out in argon, each for one to three hours, to produce a suitable ΣA. In practice, four or five rolling steps were generally carried out to produce solid cladding tubes of conventional diameter and thickness. Finally, a final annealing step was carried out in an inert atmosphere, at about 485° C. for one to three hours if a stress-relieved structure was required, or at about 580° C. for about two hours if a recrystallized structure was required.

The tests were carried out on samples to compare the alloys of the invention containing different tin contents with Zircaloy-4 type alloys.

Generalized Corrosion

Tests were carried out on recrystallized samples in an autoclave, in water and steam. The results are shown in Table I below.

TABLE I

| ALLOY | Weight gain ΔP (mg/dm²) | |
|---|---|---|
| | Water 350° C. - 210 days | Steam 400° C. - 30 days |
| 1 Zr 0.6 Fe; 0.3 V | 29.2 | 26.4–38.5 |
| 2 Zr 0.6 Fe; 0.3 V; 0.5 Sn | 31 | 27.5 |
| 3 Zr 0.6 Fe; 0.3 V; 1.0 Sn | 32.2 | 30.4 |
| 4 Zr 0.6 Fe; 0.3 V; 1.5 Sn (invention) | 32 | 30.9 |
| 5 Zircaloy 4 | 43.9–47.2 | 32 |

The results obtained, in particular for alloy 4 which was in accordance with the invention, show that an increase in the tin content from 0 to 1.5% had no effect on generalized corrosion resistance in water and steam.

Corrosion in a Lithium Medium and Creep Resistance

The influence of tin content on the corrosion resistance of Zircaloy 4 type alloys in a medium containing lithium hydroxide was studied in water containing 70 ppm of lithium at 360° C. The results are shown in Table II.

TABLE 2

| % Sn in alloy | Weight gain ΔP (mg/dm²) | | |
|---|---|---|---|
| | 50 days | 100 days | 150 days |
| 1.5 | 48 | 78 | 112 |
| 1.3 | 51 | 85 | 148 |
| 0.5 | 35 | 72 | 740 |

The highly favorable influence of a high tin content (between 1.2% and 1.5%) on the corrosion resistance in a lithium hydroxide medium was observed in alloys in accordance with the invention.

A high tin content was also shown to be favorable to the creep resistance of this alloy. Measurements of diametral creep $\epsilon_D$ at 400° C. over 240 hours at a pressure of 130 MPa gave the following values for a stress-relieved alloy:

| Sn content (%) | $\epsilon_D$ (%) |
|---|---|
| 1.5 (invention) | 1.5 |
| 1.3 (invention) | 2 |
| 0.5 | 4.2 |

The results obtained show a quasi-linear relationship between the Sn content and the creep characteristics.

We claim:

1. A zirconium-based alloy tube for constituting all or a portion of a cladding or guide tube for a nuclear fuel assembly, characterized in that the alloy contains, by weight, 1.0% to 1.7% of tin, 0.55% to 0.8% of iron, 0.20% to 0.60% in total of at least one element selected from chromium and vanadium, and 0.10% to 0.18% of oxygen, the carbon and silicon contents being respectively in the range 50 ppm to 200 ppm and in the range 50 ppm to 120 ppm, the alloy further containing only zirconium and unavoidable impurities.

2. A tube according to claim 1, characterized in that the alloy is completely recrystallized.

3. A tube according to claim 1, characterized in that the alloy is in a completely stress-relieved.

4. A tube according to claim 1, characterized in that the alloy contains about 1.3% of tin, 0.60% of iron, 0.25% of vanadium or chromium, 0.14% of oxygen, 140 ppm of carbon and 90 ppm of silicon.

5. A tube according to claim 1 characterized in that the Fe/V ratio is close to 2/1, the alloy being practically free of chromium.

6. A tube according to claim 1 characterized in that the Fe/Cr ratio is close to 2/1, the alloy being practically free of vanadium.

7. A tube according to claim 1 characterized in that the sum of the iron and either vanadium or chromium content exceeds 0.7%.

8. A process for producing an alloy tube in accordance with any one of claims 1 to 7, characterized in that it comprises successively: casting an ingot and forging to a solid bar; quenching the heated bar to form the β phase; optional annealing in the range 640° C. to 760° C. to form the α phase; drawing a pierced billet to a tubular blank; optional annealing in the range 600° C. to 750° C. in α phase; successive cold rolling steps to form decreasing thicknesses, with intermediate heat treatments in an inert atmosphere or in a vacuum at a temperature in the range 640° C. to 760° C., advantageously about 730° C., for the first two treatments and 700° C. for subsequent treatments; and a final annealing step in an inert atmosphere or under vacuum.

9. A processing according to claim 8, characterized in that the final annealing step is stress-relieving annealing carried out in the range 450° C. to 500° C.

10. A process according to claim 8, characterized in that the final annealing step is recrystallization annealing carried out in the range 565° C. to 630° C.

11. A tube of zirconium-based alloy for constituting at least an inner or outer portion of a cladding or guide tube for a nuclear fuel assembly, wherein said alloy contains, by weight, 1.0% to 1.7% of tin, 0.55% to 0.8% of iron, 0.20% to 0.60% in total of at least one element selected from a group consisting of chromium and vanadium, and 0.10% to 0.18% of oxygen, and further contains controlled amounts of carbon and silicon contents being respectively in a range of 50 ppm to 200 ppm and in a range of 50 ppm to 120 ppm, the alloy further containing only zirconium and unavoidable impurities.

12. A tube according to claim 11, wherein the alloy is completely recrystallized.

13. A tube according to claim 12, wherein the alloy is completely stress-relieved.

14. A tube according to claim 11, wherein the alloy contains about 1.3% of tin, 0.60% of iron, 0.25% of vanadium or chromium, 0.14% of oxygen, 140 ppm of carbon and 90 ppm of silicon.

15. A tube according to claim 11, wherein the alloy is substantially free of chromium and has a Fe/V ratio of about 2/1.

16. A tube according to claim 14, having a Fe/Cr ratio of about 2/1, the alloy being substantially free of vanadium.

17. A tube according to claim 14, wherein the sum of the iron, vanadium and chromium content exceeds 0.7%.

18. A process for producing a tube of a zirconium-base alloy, wherein said alloy contains, by weight, 1.0% to 1.7% of tin, 0.55% to 0.8% of iron, 0.20% to 0.60% in total of at least one element selected from a group consisting of chromium and vanadium, and 0.10% to 0.18% of oxygen, and further contains controlled amounts of carbon and silicon respectively in a range of 50 ppm to 200 ppm and in a range of 50 ppm to 120 ppm, the alloy further containing only zirconium and unavoidable impurities, said process comprising the steps of:

(a) casting an ingot and forging said ingot into a solid bar;

(b) heating the solid bar and quenching it in β phase;

(c) piercing the solid bar and drawing it into a tubular blank;

(d) carrying out successive cold rolling steps for obtaining decreasing thicknesses, with intermediate heat treatments in an inert atmosphere or in a vacuum at a temperature in a range of 640° C. to 760° C.; and (e) carrying out annealing in an inert atmosphere or under vacuum.

19. A process according to claim 18, wherein said heat treatments are carried out at about 730° C. for the first two treatments and 700° C. for subsequent treatments.

20. A process according to claim 18, wherein the final annealing step is stress-relieving annealing carried out in the range 450° C. to 500° C.

21. A process according to claim 18, wherein the final annealing step is recrystallization annealing carried out in a range of 565° C. to 630° C.

22. A process according to claim 18, wherein the heat treatments as a whole are such that $\Sigma A$ is between $10^{-18}$ and $10^{-16}$.

23. A process according to claim 18, wherein the first annealing step is carried out at about 730° C.

24. A process according to claim 18, wherein the second annealing step after drawing is carried out at about 650° C.

25. A process according to claim 18, further comprising a step of annealing in a range of 600° C. to 750° C. in α phase after quenching.

* * * * *